United States Patent
Kikinis (10) Patent No.: US 7,120,141 B2
(45) Date of Patent: Oct. 10, 2006

(54) INTEGRATING SIP CONTROL MESSAGING INTO EXISTING COMMUNICATION CENTER ROUTING INFRASTRUCTURE

(75) Inventor: Dan Kikinis, Saratoga, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 64 days.

(21) Appl. No.: 09/927,301

(22) Filed: Aug. 10, 2001

(65) Prior Publication Data

US 2002/0018464 A1   Feb. 14, 2002

Related U.S. Application Data

(63) Continuation-in-part of application No. 09/160,558, filed on Sep. 24, 1998.

(51) Int. Cl.
*H04L 12/66* (2006.01)
(52) U.S. Cl. .................. 370/352; 370/401; 370/466; 370/467
(58) Field of Classification Search ................ 370/352, 370/356, 395.1, 395.31, 395.52; 379/221.06, 379/265.01, 265.02, 265.09, 265.11, 93.14, 379/93.15, 142.07, 142.15
See application file for complete search history.

(56) References Cited

U.S. PATENT DOCUMENTS

| | | | |
|---|---|---|---|
| 6,389,007 B1 | 5/2002 | Shenkman et al. | |
| 6,438,114 B1 * | 8/2002 | Womack et al. | 370/349 |
| 6,560,329 B1 * | 5/2003 | Draginich et al. | 379/265.02 |
| 6,678,735 B1 * | 1/2004 | Orton et al. | 709/230 |
| 2002/0110113 A1 * | 8/2002 | Wengrovitz | 370/352 |
| 2002/0122547 A1 * | 9/2002 | Hinchey et al. | 379/221.01 |

FOREIGN PATENT DOCUMENTS

| | | |
|---|---|---|
| WO | WO 00/76158 A1 | 12/2000 |
| WO | WO 01/35680 A1 | 5/2001 |
| WO | WO 01/43389 A2 | 6/2001 |

OTHER PUBLICATIONS

Dan Kikinis Integrating SIP Control Messaging into Existing Call Centers Jun. 27, 2001, Disclosure Document #496199.

\* cited by examiner

*Primary Examiner*—Chi Pham
*Assistant Examiner*—Justin M. Philpott
(74) *Attorney, Agent, or Firm*—Donald R. Boys; Central Coast Patent Agency, Inc.

(57) ABSTRACT

A software suite is disclosed for routing communication events over a data-packet-network using an IP session initiation and management protocol. The software suite comprises, a server application running on the network for computing and serving routing determinations per request, a session management application running on the network for initiating and managing routed and established session events, a parsing application running on the network for parsing request data received under session initiation protocol and a conversion application running on the network for converting data received under session initiation protocol into a routing request. All received communication requests for routing are in the form of the session initiation protocol wherein they are parsed and converted into routing requests processed by the server application and routed to determined destinations and wherein events are established as session events conducted under the session initiation and management protocol.

12 Claims, 5 Drawing Sheets

INTEGRATING SIP CONTROL MESSAGING INTO EXISTING COMMUNICATION CENTER ROUTING INFRASTRUCTURE

CROSS-REFERENCE TO RELATED DOCUMENTS

The present invention is a Continuation-In-Part (CIP) to a U.S. patent application Ser. No. 09/160,558, entitled "Method and Apparatus for Providing Integrated Routing for PSTN and IPNT Calls in a Call Center", filed on Sep. 24, 1998, disclosure of which is incorporated herein in its entirety by reference. The inventor of the instant application has also participated in the document disclosure program and claims priority to the contents of document disclosure number 496199 dated Jun. 19, 2001.

FIELD OF THE INVENTION

The present invention is in the field of telephony communication and pertains more particularly to methods and apparatus for using session initiation protocol (SIP) in the routing infrastructure of a communication center.

BACKGROUND OF THE INVENTION

In the field of telephony communication, there have been many improvements in technology over the years that have contributed to more efficient use of telephone communication within hosted call-center environments. Most of these improvements involve integrating the telephones and switching systems in such call centers with computer hardware and software adapted for, among other things, better routing of telephone calls, faster delivery of telephone calls and associated information, and improved service with regards to client satisfaction. Such computer-enhanced telephony is known in the art as computer-telephony integration (CTI).

Generally speaking, CTI implementations of various design and purpose are accomplished both within individual call-centers and, in some cases, at the network level. For example, processors running CTI software applications may be linked to telephone switches, service control points (SCP), and network entry points within a public or private telephone network. At the call-center level, CTI-enhanced processors, data servers, transaction servers, and the like, are linked to telephone switches and, in some cases, to similar CTI hardware at the network level, often by a dedicated digital link. CTI and other hardware within a call-center is commonly referred to as customer premises equipment (CPE). It is the CTI processor and application software at such centers that provides computer enhancement to a call center.

In a CTI-enhanced call center, telephones at agent stations are connected to a central telephony switching apparatus, such as an automatic call distributor (ACD) switch or a private branch exchange (PBX). The agent stations may also be equipped with computer terminals such as personal computer/video display unit's (PC/VDU's) so that agents manning such stations may have access to stored data as well as being linked to incoming callers by telephone equipment. Such stations may be interconnected through the PC/VDUs by a local area network (LAN). One or more data or transaction servers may also be connected to the LAN that interconnects agent stations. The LAN is, in turn, connected to the CTI processor, which is connected to the call switching apparatus of the call center.

When a call arrives at a call center, whether or not the call has been pre-processed at an SCP, typically at least the telephone number of the calling line is made available to the receiving switch at the call center by the network provider. This service is available by most networks as caller-ID information in one of several formats such as Automatic Number Identification Service (ANIS). If the call center is computer-enhanced (CTI) the phone number of the calling party may be used to access additional information from a customer information system (CIS) database at a server on the network that connects the agent workstations. In this manner information pertinent to a call may be provided to an agent, often as a screen pop.

In recent years, advances in computer technology, telephony equipment, and infrastructure have provided many opportunities for improving telephone service in publicly-switched and private telephone intelligent networks. Similarly, development of a separate information and data network known as the Internet, together with advances in computer hardware and software have led to a new multi-media telephone system known in the art by several names. In this new systemology, telephone calls are simulated by multi-media computer equipment, and data, such as audio data, is transmitted over data networks as data packets. In this application the broad term used to describe such computer-simulated telephony is Data Network Telephony (DNT).

For purposes of nomenclature and definition, the inventors wish to distinguish clearly between what might be called conventional telephony, which is the telephone service enjoyed by nearly all citizens through local telephone companies and several long-distance telephone network providers, and what has been described herein as computer-simulated telephony or DNT. The conventional system is familiar to nearly all, and is often referred to in the art as connection-oriented-switched-telephony (COST). The COST designation will be used extensively herein. The computer-simulated, or DNT systems are familiar to those who use and understand computer systems. Perhaps the best example of DNT is telephone service provided over the Internet, which will be referred to herein as Internet-Protocol-Network-Telephony (IPNT), by far the most extensive, but still a subset of DNT.

Both systems use signals transmitted over network links. In fact, connection to data networks for DNT such as IPNT is typically accomplished over local telephone lines, used to reach such as an Internet Service Provider (ISP). The definitive difference is that COST telephony may be considered to be connection-oriented telephony. In the COST system, calls are placed and connected by a specific dedicated path, and the connection path is maintained over the time of the call. Bandwidth is thus assured. Other calls and data do not share a connected channel path in a COST system. In a DNT system, on the other hand, the system is not dedicated or connection oriented. That is, data, including audio data, is prepared, sent, and received as data packets. The data packets share network links, and may travel by variable paths, being reassembled into serial order after receipt. Therefore, bandwidth is not guaranteed.

Under ideal operating circumstances a DNT network, such as the Internet, has all of the audio quality of conventional public and private intelligent telephone-networks, and many advantages accruing from the aspect of direct computer-to-computer linking. However, DNT applications must share the bandwidth available on the network in which they are traveling. As a result, real-time voice communication may at times suffer dropout and delay. This is at least partially due to packet loss experienced during periods of less-than-needed bandwidth which may prevail under certain conditions such as congestion during peak periods of use, and so on.

Recent improvements to available technologies associated with the transmission and reception of data packets during real-time DNT communication have enabled companies to successfully add DNT, principally IPNT capabilities, to existing CTI-enhanced call centers. Such improvements, as described herein and known to the inventor, include methods for guaranteeing available bandwidth or quality of service (QoS) for a transaction, improved mechanisms for organizing, coding, compressing, and carrying data more efficiently using less bandwidth, and methods and apparatus for intelligently replacing lost data by using voice supplementation methods and enhanced buffering capabilities.

In typical call centers, DNT is accomplished by Internet connection and IPNT calls. For this reason, IPNT and the Internet will be used almost exclusively in examples to follow. It should be understood, however, that this usage is exemplary, and not limiting.

In systems known to the inventors, incoming IPNT calls are processed and routed within an IPNT-capable call center in much the same way as COST calls are routed in a CTI-enhanced center, using similar or identical routing rules, waiting queues, and so on, aside from the fact that there are two separate networks involved. Call centers having both CTI and IPNT capability utilize LAN-connected agent-stations with each station having a telephony-switch-connected headset or phone, and a PC connected, in most cases via LAN, to the LAN over which IPNT calls may be routed. Therefore, in most cases, IPNT calls are routed to the agent's PC while conventional telephony calls are routed to the agent's conventional telephone or headset. However, a method known to the inventor allows one headset to be used at an agent's station for handling both IPNT and COST calls. This is accomplished via connecting the agent's telephone to the sound card on the agent's PC/VDU with an I/O cable. In most prior art and current art systems, separate lines and equipment must be implemented for each type of call weather COST or IPNT.

Due in part to added costs associated with additional equipment, lines, and data ports that are needed to add IPNT capability to a CTI-enhanced call-center, companies are currently experimenting with various forms of integration between the older COST system and the newer IPNT system. For example, by enhancing data servers, interactive voice response units (IVRs), agent-connecting networks, and so on, with the capability of understanding Internet protocol, data arriving from either network may be integrated requiring less equipment and lines to facilitate processing, storage, and transfer of data. However, telephony, trunks and IPNT network lines representing the separate networks involved still provide for significant costs and maintenance.

In some current art implementations, incoming data from the COST network and the Internet is caused to run side by side from the network level to a call center over a telephone connection (T1/E1) acting as a telephone-data bridge, wherein a certain channels are reserved for COST connection, and this portion is dedicated as is necessary in COST protocol (connection oriented), and the remainder is used for DNT such as IPNT calls, and for perhaps other data transmission. Such a service is generally offered by a local phone company. This service eliminates the requirement for leasing numerous telephony trunks and data-network connections. Routing and other equipment, however, must be implemented at both the call-center level and network level significantly reducing any realized cost savings.

A significant disadvantage of such a bridge, having dedicated equipment on each end, is the dedicated nature of individual channels over the bridging link. Efficient use of bandwidth cannot be assured during variable traffic conditions that may prevail at certain times. For example, dedicated channels assigned to IPNT traffic would not be utilized if there were not enough traffic to facilitate their use. Similarly, if there was more COST traffic than the allotted number of COST channels could carry, no additional channels could be made available.

In a yet more advanced system, known in some call centers, a central switch within the call center is enhanced with IP conversion capability and can communicate via LAN to connected IP phone-sets and PC's eliminating the need for regular telephone wiring within a call center. However, the service is still delivered via a telephone-data bridge as described above. Therefore, additional requirements for equipment and inefficiency regarding use of bandwidth are still factors.

In still other systems known to the inventor, IPNT to COST conversion or COST to IPNT conversion is performed within the call center instead of via a network bridge. This is accomplished via a gateway connected to both an IPNT router and a central telephony-switching apparatus. In the first case, all calls are converted to and routed as COST calls over internal telephone wiring to switch-connected headsets. In the second case, all COST calls are converted to and routed as IPNT calls over a LAN to individual PC/VDU's.

In all of the described prior art systems, the concerted goal has been to integrate COST and IPNT data via converging at the network level or within the call center. The addition of dedicated hardware both at the network level and within the call center adds to the expense of providing such integrated data.

In a system known to the inventor and described with reference to Ser. No. 09/160,558 listed in the cross-reference section of this specification, an integrated router is provided within a call center. The integrated router monitors and controls both a telephony switch receiving and forwarding connection-oriented, switched telephony (COST) calls and a Data Network Telephony (DNT) processor receiving and forwarding DNT calls. The integrated router is enabled by software to consult a common data repository storing status of agents answering both types of calls within the center and routes all calls according to a single set of routing rules, which can take a variety of forms. In one aspect, telephone devices at agent stations are adapted to handle both COST and DNT calls.

It has occurred to the inventor that in addition to being able to unify all routed events within a communication center under a common set of rules, it would be desirable to adapt established IP network protocols for use as routing tools within a communication center for the purpose of saving time and costs of developing proprietary protocols and expensive client applications using them.

One standard Internet-based protocol that may be adapted for communication center use is the well-known session initiation protocol (SIP). Very basically, SIP is an application-layer control (signaling) protocol for creating, modifying and terminating communication sessions with one or more participants. These sessions include Internet multimedia conferences, Internet telephone calls and multimedia distribution. Members in a session can communicate via multicast or via a mesh of unicast relations, or a combination of these.

A SIP session can include both persons and automated systems such as a media storage service. A SIP session can include both unicast and multicast sessions. A session initiator does not necessarily have to be a member of an initiated session to which SIP is used to initiate. SIP transparently supports name mapping and redirection services, allowing the implementation of ISDN and Intelligent Network telephony subscriber services. These facilities also enable personal mobility.

In the parlance of telecommunications intelligent network services, personal mobility is defined as the ability of end users to originate and receive calls and access subscribed telecommunication services on any terminal in any location, and the ability of the network to identify end users as they move. Personal mobility is based on unique identification numbering and compliments terminal mobility, which enables an end terminal to be moved from one sub-net to another.

SIP is designed as part of the well-known IETF multimedia data and control architecture, which is currently incorporating protocols such as RSVP for reserving network resources; the real-time transport protocol (RTP) for transporting real-time data and providing QoS feedback; the real-time streaming protocol (RTSP) for controlling delivery of streaming media; the session announcement protocol (SAP) for advertising multimedia sessions via multicast; and the session description protocol (SDP) for describing multimedia sessions.

It is known to the inventors that SIP can be used in conjunction with other call setup and signaling protocols. In this mode, an end system uses SIP exchanges to determine the appropriate end system address and protocol from a given address that is protocol-independent. For example, SIP could be used to determine that the party can be reached via H.323, obtain the H.245 gateway and user address and then use H.225.0 to establish a call, for example. In another example, SIP might be used to determine that a call recipient is reachable via the PSTN and indicate the phone number to be called, possibly suggesting an Internet-to-PSTN gateway to be used.

Although SIP protocol is extremely versatile in application, it is yet to be incorporated in call routing infrastructure that depends on a variety of strict call routing rules such as would be the case within a complex communication center. In a complex central routing system such as would be established in a state-of-art communication center, practicing IPNT and COST/DNT integration, further innovation is required to enable application of SIP as a routing tool that is integrated with established routing protocols.

What is clearly needed is a routing system enabled to route both COST and IPNT calls to available agents sharing a LAN within a call center, wherein SIP protocols are used to set-up, manage, and terminate sessions between agents and clients of the center and between agents and other agents associated with the center according to established routing rules setup for the center.

SUMMARY OF THE INVENTION

In a preferred embodiment of the present invention, a software suite is provided for routing communication events over a data-packet-network using an IP session initiation and management protocol. The software suite comprises, a server application running on the network for computing and serving routing determinations per request, a session management application running on the network for initiating and managing routed and established session events, a parsing application running on the network for parsing request data received under session initiation protocol and a conversion application running on the network for converting data received under session initiation protocol into a routing request. All received communication requests for routing are in the form of the session initiation protocol wherein they are parsed and converted into routing requests processed by the server application and routed to determined destinations and wherein events are established as session events conducted under the session initiation and management protocol.

In a preferred embodiment, the data-packet-network comprises the Internet network. In this preferred embodiment, the Internet network further connects to a LAN network. In one aspect, the software suite controls internal routing within a communication center. In another aspect, the session management application follows SIP protocols. In still another aspect, the communication events are sourced from clients of the center and routed to agents or automated systems at work within the center.

In another aspect of the present invention, a method is provided for intelligent routing of communication events from a source to a destination over a data-packet-network using a session initiation and management protocol. The method comprises the steps of, (a) receiving a request at a routing point for establishing a session event, the request of the form the session initiation and management protocol, (b) parsing the request for body content and header information, (c) converting the parsed data into a formal routing request of a form generic to a routing determination software, (d) determining the best destination according to the request and returning the result to the routing point and (e) establishing the communication event between the source party and the determined destination under the session protocol.

In a preferred embodiment, the data-packet-network comprises the Internet network. Also in a preferred embodiment, the Internet network further connects to a LAN network. In one embodiment, the method is practiced within a communication center. In one aspect of the method in step (a) the routing point is a proxy server and the session initiation and management protocol is SIP protocol. In another aspect of the method in step (b) the body content of the request is an electronic form populated by the requesting party. In one aspect of the method in step (d) additional information pertinent to the requesting party not originally part of the request is obtained passed back to the routing point along with the determination results. In one aspect of the method in step (e) the routing point establishes and maintains the session until a party of the session terminates the session. In another aspect of the method in step (e) the session is established and maintained by a network-connected node other than the routing node.

Now, for the first time, a routing system is provided that is able to route both COST and IPNT calls to available agents sharing a LAN within a call center wherein SIP protocols are used to set-up, manage, and terminate sessions between agents and clients of the center and between agents and other agents associated with the center according to established routing rules set-up for the center.

DESCRIPTION OF THE PREFERRED EMBODIMENTS

Figure 1:
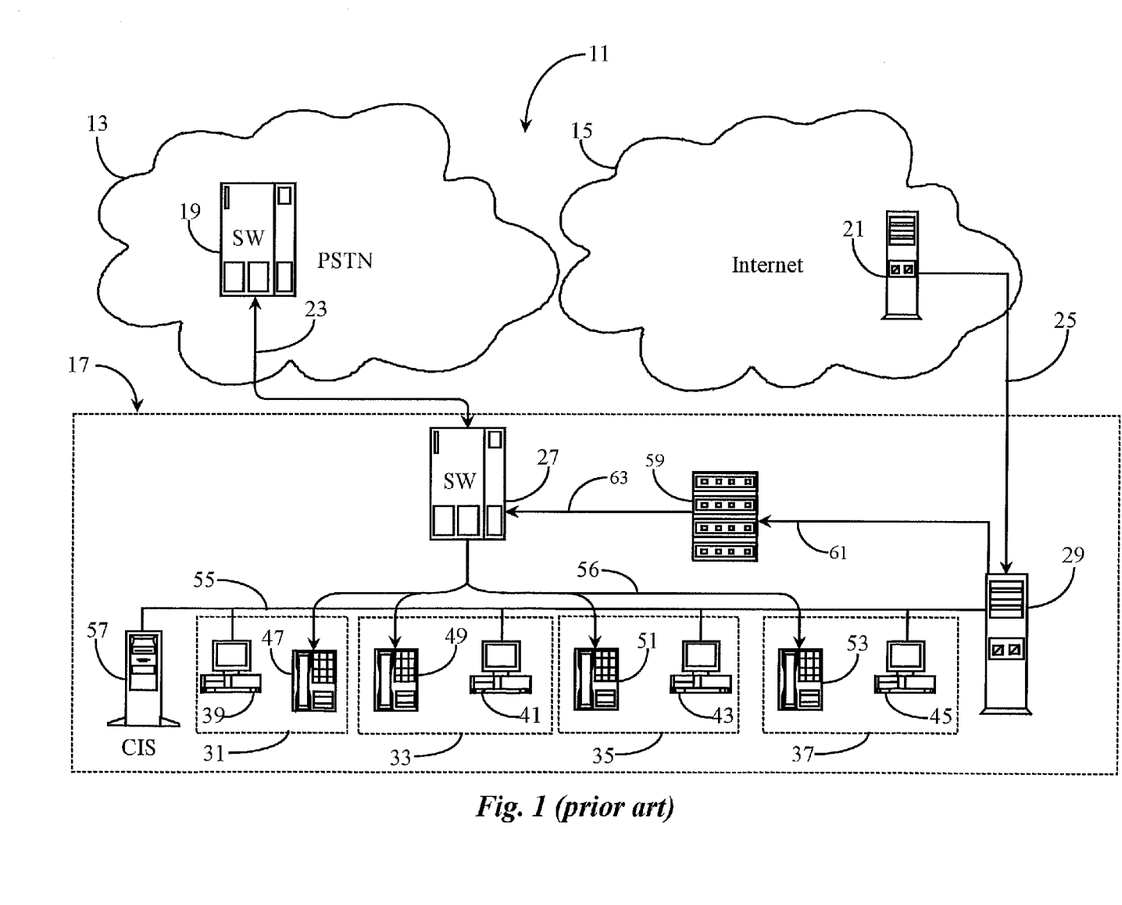
FIG. 1 is a system diagram of a call center connected to a telecommunication network using IPNT to COST conversion according to prior art.

FIG. 1 is a system diagram of a call center connected to a telecommunication network using IPNT to COST conversion according to prior art. As described briefly with regards to the background section, various prior art telecommunication networks utilize network-bridging techniques for the purpose of causing IPNT and COST incoming calls to run parallel into the call center. In current systems, as was also described, various implementations have been made within the call center for converting IPNT to COST, and conversely, COST to IPNT. FIG. 1 represents one such current art system.

In FIG. 1 telecommunications network 11 comprises a publicly-switched telephone network (PSTN) 13, the Internet network 15, and a call center 17. PSTN network 13 may be a private network rather than a public network, and Internet 15 may be another public or a private data network as are known in the art.

In this basic prior art example, call center 17 is equipped to handle both COST calls and IPNT calls. Both COST calls and IPNT calls are delivered to call-center 17 by separate network connections. For example, a telephony switch 19 in the PSTN may receive incoming telephone calls and rout them over a COST network trunk 23 to a central switching apparatus 27 located within call center 17. IPNT calls from Internet 15 are routed via a data router 21 over a data-network connection 25 to an IPNT router 29 within call center 17. In this example, network switch 19 is meant to represent a wide variety of processing and switching equipment in a PSTN, and router 21 is exemplary of many routers and IP switches in the Internet, as known in the art.

Call center 17 further comprises four agent stations 31, 33, 35, and 37. Each of these agent stations, such as agent station 31, for example, comprises an agent's telephone 47 adapted for COST telephone communication and an agent's PC/VDU 39 adapted for IPNT communication and additional data processing and viewing. Agent's telephones 47, 49, 51, and 53 along with agent's PC/VDU 39, 41, 43, and 45 are in similar arrangement in agent stations 31, 33, 35, and 37 respectively. Agent's telephones, such as agent's telephone 49, are connected to COST switching apparatus 27 via telephone wiring 56.

A LAN 55 connects agent's PC/VDU's to one another and to a CPE IPNT router 29. A client-information-system (CIS) server 57 is connected to LAN 55 and provides additional stored information about callers to each LAN-connected agent. Router 29 routes incoming IPNT calls to agent's PC/VDU's that are also LAN connected as previously described. A data network connection 25 connects data router 29 to data router 21 located in Internet 15. Specific Internet access and connectivity is not shown, as such is well known in the art, and may be accomplished in any one of several ways. The salient feature to be emphasized in this prior art example is that separate connections and equipment are necessary and implemented to be able to handle both COST and IPNT calls at the call center.

Each agent's PC/VDU, such as PC/VDU 45 has a connection via LAN 55 and data network connection 25 to Internet 15 while the assigned agent is logged on to the system, however, this is not specifically required but rather preferred, so that incoming IPNT calls may be routed efficiently. Dial-up connecting rather than a continuous connection to Internet 15 may sometimes be employed.

An agent operating at an agent station such as agent station 33 may have COST calls arriving on agent's telephone 49 while IPNT calls are arriving on agent's PC/VDU 41. In examples prior to this example, router 29 would not have a connection to central switching apparatus 27. Having no such connection creates a cumbersome situation, requiring agents to distribute their time as best they can between the two types of calls. Thus, agent time is not utilized to maximum efficiency with respect to the total incoming calls possible from both networks.

In this embodiment however, router 29 is connected to an IPNT-to-COST gateway 59 via data connection 61. Gateway 59 is connected to central switch 27 via CTI connection 63. Gateway 59 is adapted to convert all incoming and outgoing IPNT calls to COST calls where they may be routed over wiring 56 to agents (incoming), or over trunk 23 to switch 19 in cloud 13 (outgoing). In this way, agents may use switch-connected telephones, such as telephone 47 to answer both IPNT-to-COST converts and regular incoming COST calls. The agent's time is better utilized, and additional network equipment comprising a network bridge and associated network connections are not required.

This prior art example, however, presents some problems and limitations. One problem is that traditional COST equipment such as routers, switches, and wiring may have to be significantly expanded to handle more traffic regarding the added call-load received from cloud 15. Further, the ability to predict possible call overload situations is significantly complicated because of the convergence of IPNT calls into the COST routing system. As IPNT calls are now received by agents as COST calls, certain features inherent to IPNT applications will be lost such as multimedia enhancements, and the like.

One advantage with this example is that calls originating as IPNT calls within call center 17 may be sent as IPNT calls over data connection 25, or as converted COST calls over trunk 23. Another advantage is that LAN 55 is free to carry data other than IPNT audio packets.

Figure 2:
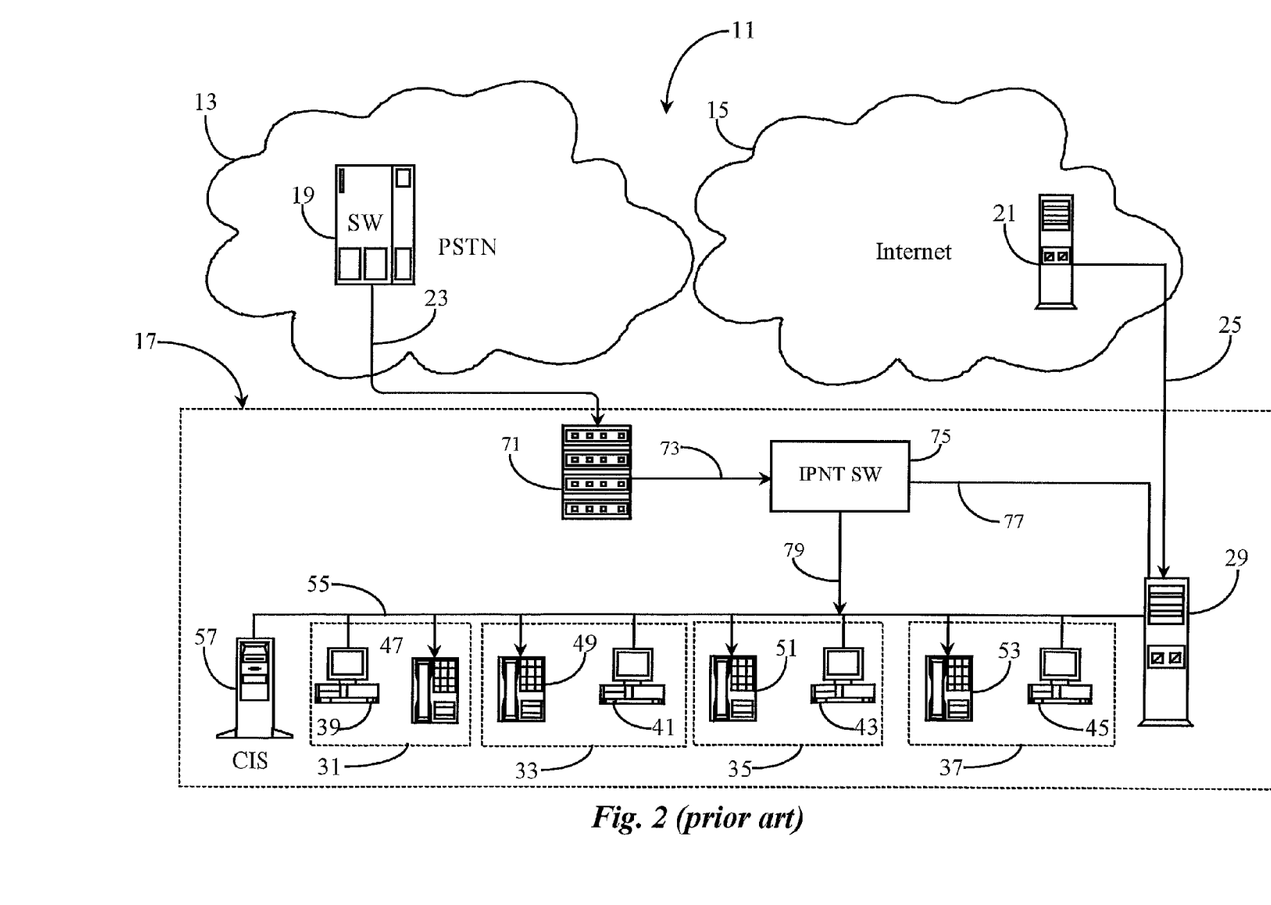
FIG. 2 is a system diagram of the call center and telecommunication network of FIG. 1 using IPNT switching at the call center according to prior art.

FIG. 2 is a system diagram of the call center and telecommunication network of FIG. 1 using IPNT switching at the call center according to prior art. This prior art example is essentially reversed from the prior art example described in FIG. 1. For the sake of saving space and avoiding redundancy, elements found in this example that are identical to the example of FIG. 1 will not be re-introduced.

Call center 17 receives COST calls from cloud 13 over trunk 23, and IPNT calls from cloud 15 over data connection 25 as described with the prior art example of FIG. 1. However, instead of having a central telephony-switch such as switch 27 of FIG. 1, a COST-to-IPNT gateway 71 is provided and adapted to convert COST calls to IPNT calls.

After converting incoming COST calls to IPNT calls, these are routed via data connection 73 to an IPNT switch 75. IPNT switch 75 is adapted to distribute the resulting IPNT calls to selected agent's over LAN 55. Regular IPNT calls are routed to LAN-connected agents via router 29.

Agent's telephones 47–53 are, in this example, adapted as IP phones and are each connected to LAN 55. Internal wiring and other COST related architecture is not required, which is one distinct advantage of this prior art system.

A disadvantage of this system is that there is no provision to make outbound calls to the PSTN 13. Only further enhancement to gateway 71 to convert IPNT calls to COST calls enables out-bound dialing to PSTN 13 from within call center 17. Under heavy call-load situations, a dual gateway such as would be the case with gateway 71 may become congested and cause delay. Additional apparatus may be required to alleviate this problem. In some cases wherein there are concerted outbound campaigns taking place on a frequent basis, it may be more prudent to maintain a COST switch and internal wiring within call center 17 connected to either agent telephones (maintaining dual capability) or, to add a second set of telephones dedicated for outbound campaigns. Moreover, agents are reintroduced with a problem solved in the example of FIG. 1 of having to deal with incoming calls to both IP phones, and PC/VDU's.

Figure 3:
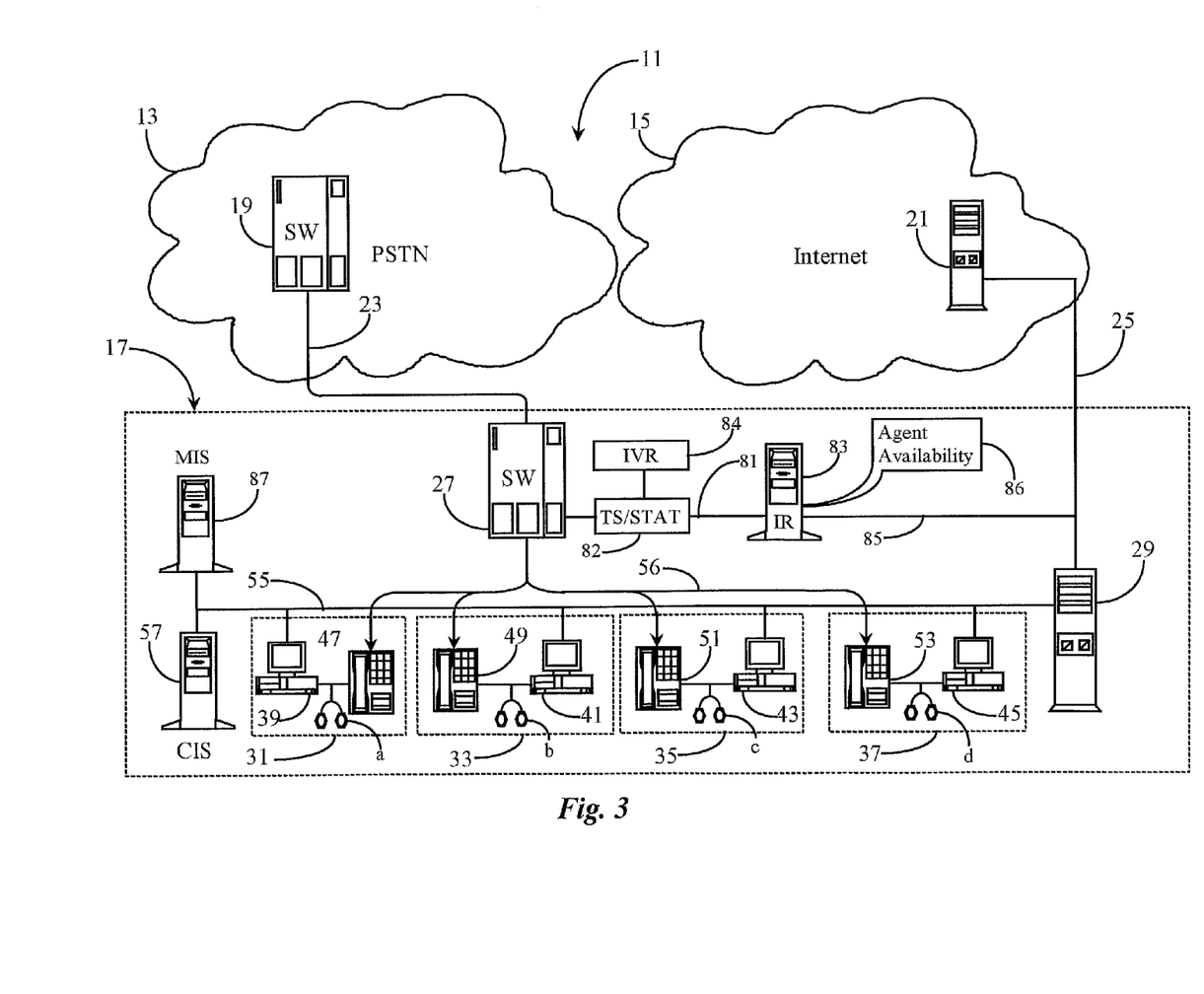
FIG. 3 is a system diagram of the call center and telecommunication network of FIG. 1 enhanced with integrated routing according to an embodiment of the present invention.

FIG. 3 is a system diagram of the call center and telecommunication network of FIG. 1 enhanced with integrated routing according to an embodiment of the present invention. As discussed with reference to FIG. 2, common elements introduced with the prior art example of FIG. 1 will not be reintroduced here unless they are altered according to an embodiment of the present invention.

According to a preferred embodiment of the present invention, call center 17 receives COST and IPNT calls from their respective separate networks comprising telecommunication system 11. Call center 17 is, in this example, enhanced with an integrated router (IR) 83 capable of routing both COST calls and IPNT calls. Central switch 27 is connected via CTI link to a processor running instances of a CTI application known to the inventors as T-server and Stat-server (TS/STAT). An intelligent peripheral in the form of an IVR 84 is connected to processor 82 via data link 81. Processors 82 and IVR 84 provide CTI enhancement to switch 27, as well as an application programming interface (API) to IR 83 via installed software.

It will be apparent to the skilled artisan that processor 82, IVR 84 and IR 83 may be implemented in a single computing machine executing all of the necessary software, but the functions have separated here for clarity in description.

A multimedia data server (MIS) 87 is connected to LAN 55, and is adapted to store and serve certain multimedia content as known in the art. Switch 27 and Router 29 are maintained as call-arrival points for calls arriving from either PSTN 13 or Internet 15 adhering to the separate network-architecture previously described.

IR 83 performs in an innovative manner in that it not only controls central switch 27 through interaction with processor 82, and therefore routing of COST calls, but also controls processor 29 and the routing of IPNT calls. IR 83 controls routing of both COST and IPNT calls whether such calls are incoming or outgoing.

An agent status-table 86 is a real-time database containing agent availability information, which is continually updated as operation of the call center proceeds. Table 86 may reside in IR 83 as shown, or may reside on processor 82 as part of the T-Server software. Table 86 keeps track of when agents log on or off to the system, and which agents are busy on calls (either COST or IPNT). It will be appreciated that any combination of rules set by the company hosting center 17 may be in place such as priority routing, routing based on skill, statistical routing, and so on, in various combinations known to the inventors.

Integrated routing as provided by IR 83 allows calls of both types (COST/IPNT) to be distributed evenly among available agents without adding expensive call conversion equipment, or effecting outbound dialing capabilities.

Yet another improvement in this example over prior art systems is known to the inventor and implemented at some or all agent stations such as stations 31–37. As briefly described with reference to the background section, agent stations 31–37 have PC-connected telephones. An I/O cable completes this interface via connection from a telephone receiver/transceiver apparatus such as on telephone 53 to a sound card installed on an associated PC such as PC/VDU 45. Individual one's of headsets such as headsets a-d are connected either to each telephone or each PC/VDU and are adapted to allow an agent to engage both COST and IPNT calls using the same headset.

It will be apparent to one with skill in the art that the integrated routing system of the present invention may be utilized in any call center capable of receiving both COST and IPNT (or other DNT) communication. It will also be apparent to one with skill in the art that the present invention may implemented as part of a CTI software package, or held separately and integrated with such a CTI implementation.

SIP-Based Call Control Management

In another aspect of the present invention, the inventor provides a mechanism for incorporating SIP protocol as a call management tool within a communication center. The methods and apparatus of the invention are described in enabling detail below.

Figure 4:
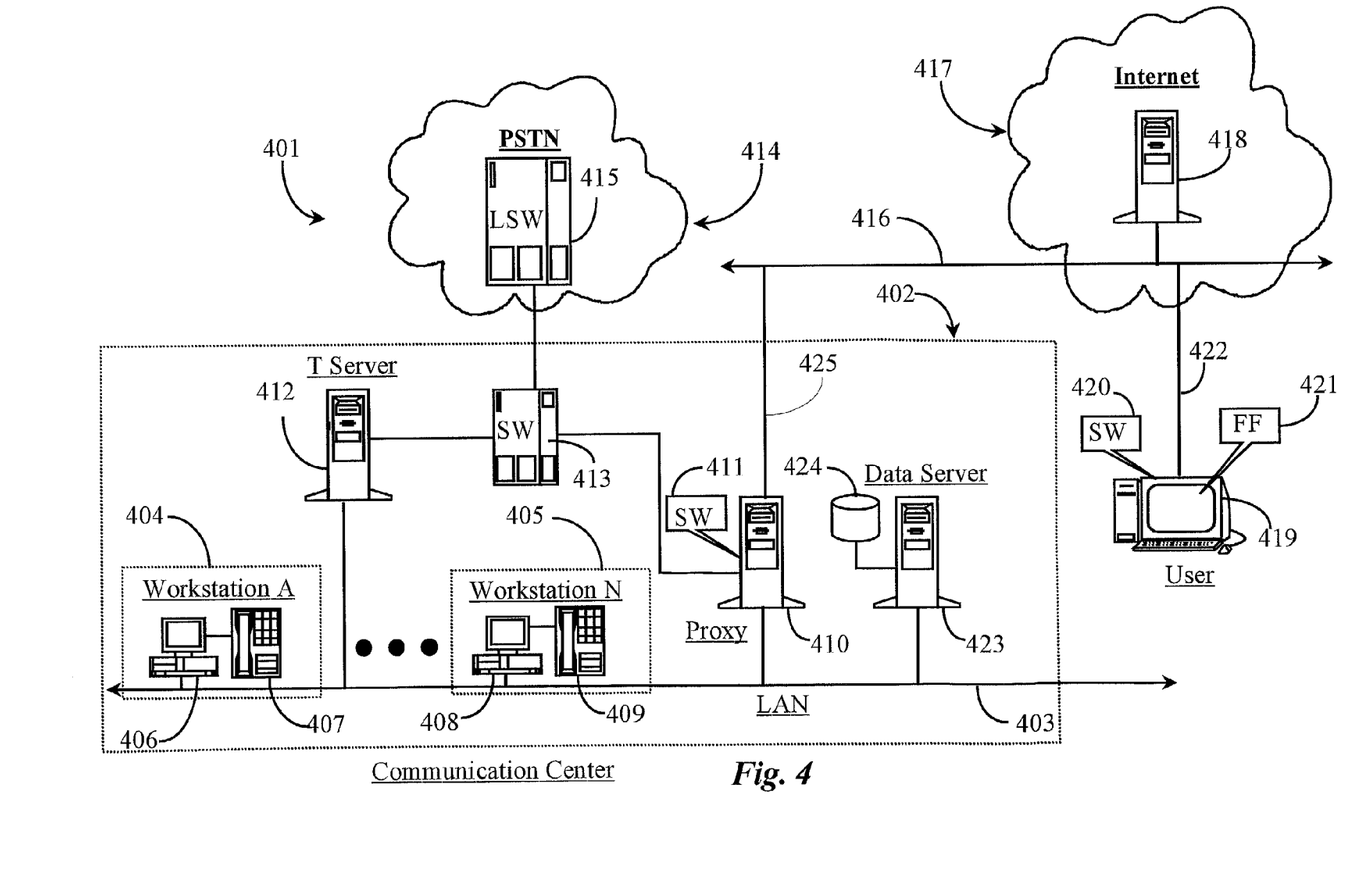
FIG. 4 is an architectural overview of a communication network wherein SIP messaging capability is integrated with routing infrastructure according to an embodiment of the present invention.

FIG. 4 is an architectural overview of a communication network 401 wherein SIP messaging capability is integrated with routing infrastructure according to an embodiment of the present invention. Network 401 comprises a PSTN 414, a data -packet-network 417, which in this example is the well-known Internet network, and a telecommunications center 402.

PSTN 414 can be another type of COST telephone network as may be known in the art such as a private telephone network. A local telephony switch (LSW) 415 is provided within PSTN 414 and adapted as a switch that is local to communication center 402. Switch 415 may be an ACD type or PBX type telephony switch as well as other known types. It will be appreciated by the skilled artisan that there will be many other switches, service control points, and other telephony equipment connected within PSTN 414. In this simple example, only switch 415 is illustrated and deemed sufficient for the purpose of describing the present invention.

CTI equipment (not shown) such as a CTI processor including IVR capability and a Stat-Server may be assumed to be present within PSTN 414 and connected to LSW 415 in cases of network-level routing. In such a case, a separate network would exist from the described equipment in the PSTN to similar equipment implemented within center 402.

Internet network 417 comprises an Internet backbone 416 extending therethrough and a backbone-connected Internet server 418 that is adapted, in this case, as an Internet access point for IPNT callers attempting to reach communication center 402. Server 418 is adapted to serve HTML electronic documents or electronic documents presented in other mark-up languages, some of which depend on protocols used by connecting end devices. WML, HDML, and other well-known protocols are exemplary of several that may be employed at server 418. Backbone 416 represents all of the lines, equipment and connection points making up the Internet network as a whole. Therefore, there are no geographic limitations to the practice of the present invention.

Backbone 416 is illustrated, in this example, as extending toward PSTN 414. In some embodiments, calls may travel back and forth between PSTN 414 and Internet 417 through a bridge or gateway (not illustrated in this example). Internet server 418 is adapted as a customer access point to communication center 402 as previously described. A user represented herein by a PC icon labeled 419 is illustrated in this example as connected to Internet backbone 416 by an Internet access path 422. Therefore user 419 has accessibility when connected to Internet server 418 for the purpose of establishing communication with communication center 402 over backbone 416.

User 419 may establish Internet access with Internet server 418 using a variety of well-known Internet access methods. Typically, user 419 would access server 418 using a dial-up modem technology through an Internet service provider (ISP) as is most common in the art. In other embodiments, user 419 may access via a cable modem connection, a wireless satellite connection, an integrated service digital network (ISDN), and so on. Although an ISP is not explicitly illustrated in this example, one such may be assumed to be present and operable between user 419 and network 417 as is well known in the art. Actual access would take place through network 414 in the case of dial-up services.

Communication center 402 represents a state-of-art center capable of integrating COST events with DNT events under a common set of routing rules. A central telephony switch (SW) 413 is provided within communication center 402 and adapted as a central office switch for routing COST communication events within the communication center, and in some cases to remote agents. SW 413 is connected to LSW 415 within PSTN 414 by at least one telephony trunk 23. Switch 413 may be an ACD or PBX type switch as well as other known types as was described further above.

Communication center 402 has a LAN 403 provided therein and adapted for TCP/IP and other applicable Internet protocols. LAN 403 is chiefly used in this example to provided network capability for connected agents, automated systems, and other equipment that is further described below.

In this example, there are two illustrated workstations A (404) and N (405) within center 402 that are connected to LAN 403 for network communication. It will be appreciated that there will typically be many more than 2 workstations connected to LAN 403 as noted by the A-N designation, in a communication center. Each workstation A-N is at least adapted with a PC and a telephone in this embodiment. In workstation 404 there is illustrated a PC 406 connected to LAN 403 and a PC-connected IP phone 407. In workstation 405 there is illustrated a LAN-connected PC 408 and a connected IP phone 409. There may be more equipment types provided in and operational in a workstation that are not illustrated in this embodiment including facsimile stations and so on. The inventor deems illustration of two main communication appliances, namely a PC and a telephone, as sufficient for the purpose of explaining the present invention.

It is noted herein that there are no COST wiring facilities implemented from switch 413 to phones 407 and 409. In this example both phones 409 and 407 are IP-capable telephones that are connected to their respective PCs 409 and 407. The connection is through the PC sound card enabling the IP phones to take calls through the PC. In this case, all COST communication events at switch 413 are converted to IPNT events and routed to LAN-connected PCs.

A transaction server (T-Server) 412 is provided within communication center 402 and connected to switch 413 by a CTI link. T-Server 412 is also illustrated herein as LAN connected. T-Server 412 embodies and serves upon request all of the routing functions employed at center 402. A data server 423 is provided within center 402 and connected to LAN 403. Server 423 serves any pertinent data regarding client and agent information as may be required to enhance routing function. A data repository 424 is provided and accessible to server 423. Repository 424 is adapted to hold any pertinent data that may be accessed and served by server 423 upon request. Updates to such data may be made periodically through LAN 403.

Types of data stored in repository 424 and served by server 423 may include, but is not limited to, agent information such as log-in status, availability data, skill data, language data, identification data, address data, and so on. Client information contained in repository 424 and servable by server 423 may include client history data, client identification data, contact information, payment history data, order status data, and so on. Server 423 functions, in this example, as a centralized information source for agents as well as for automated systems at work in the center. Information contained in repository 424 may be continually updated as events arrive and are internally routed within center 402.

A proxy server 410 is provided within center 402 and illustrated as connected to LAN 403. Proxy server 410 is adapted with a modified version of session initiation protocol (SIP) as is illustrated in this example by a software instance (SW) 411. SW 411 is installed on and executable on server 423 in accordance with events for internal routing within the center. Server 410 has an Internet connection to Internet backbone 416 by an Internet access pipeline 425. Server 410 functions also as an Internet router (IR) as described further above with reference to IR 83 of FIG. 3.

As an IR, server 410 performs all of the internal routing of events arriving thereto from Internet 417 and from PSTN 414 through switch 413. To this effect, server 410 is directly connected by a CTI link to switch 413. In one embodiment, switch 413 is adapted to convert COST events to IPNT ring events. In another embodiment, server 410 simply routes events from switch 413 but connection for such events is physically made on conventional telephones and internal telephony wiring. In still another embodiment, switch 413, if adapted as an IP conversion switch, may be directly connected to LAN 403. There are many possibilities.

User 419 has an instance of a software compatible with SIP protocol (SW) 420 executable thereon that is adapted as a simple client application to SW 411 in server 410. SW 420 may be a browser plug-in in one embodiment, for example. In another embodiment, SW 420 may be a stand-alone application. Another instance of software labeled SW 421, is illustrated on PC (user) 419 and adapted as a form-filler (FF) application. FF 421 may be assumed to be part of SW 420 as one application in many embodiments, or be connected to it in a direct or indirect manner. The inventor logically separates FF 421 from SW 420 for illustration of function only. In another embodiment, the functions of SW 420 and FF 421 may be provided in and accessible from server 418 within Internet 417.

The purpose of FF 421 is to enable a user, in this case user 419, to communicate a text reason for a desired connection event to an agent or system, of communication center 402. FF 421 provides functionality that would otherwise be covered by an interactive voice response (IVR) system that may be assumed to be implemented either in PSTN 414 and connected to switch 415, or within center 402 connected to switch 413.

User 419 may access server 418 and then be provided with applicable client software or he or she may already have the appropriate software installed as a resident program. Filling out an electronic form using FF 421 and submitting the form while connected online with server 418 causes a telephony event request to be initiated having an SIP header and the completed form as the body of the SIP message. The SIP event arrives at server 410 where SW 411 parses the message for content and separates the header information and content (form data) from the SIP message.

The parsed data is then re-formatted into language that is understood by T-server 412 and sent as a routing request to the server. Record of the event remains at server 410 until a response is received from T-server 412 concerning routing determination. T-server 412 executes any applicable routing routines using the re-formatted SIP data and sends a routing result or recommendation back to server 410. In some embodiments T-server 412 consults with server 423 for any information required for optimizing a best determination for routing the particular event.

Server 410 receives a routing determination from sever 412, and then routes the target event to an available agent or system based on the response. All SIP functionality built into SW 411 can be leveraged to provide information that is useful for establishing a successful connection.

For events arriving at switch 413 wherein there is no agent-level routing performed at PSTN 414 network level, IVR interaction can provide the equivalent of FF 421 of PC 419. SW 411 is capable of parsing a textualized of digitized version of an IVR message and of generating an SIP message containing the information. As described above, T-server 412 receives a routing request from server 410 in the form of a SIP message. Server 412 computes routing results according to included information and sends the results to server 410. Server 410 then routes the event to an appropriate agent or system connected to LAN 403.

If events arriving at switch 413 are to be passed directly to LAN 403 through a dedicated LAN connection (not shown), then server 410 simply routes notifications of pending ringing events. Alternatively, server 410 may receive the actual events digitized and my directly route them to appropriate agents or systems over LAN 403. Again, all of the functionality of SIP messaging may be tapped wherein it may be useful as a routing variable. Such functions include bandwidth reservation, handshake protocols, media designations, callback information, presence information and so on.

The method and apparatus of the present invention allows integration of strict routing conventions and SIP functionality without requiring significant modification of or provision of special application program interfaces (APIs) to be distributed to key components of the system, namely T-server 412, server 423, and perhaps at switch 413.

One with skill in the art will recognize that there may be a variety of routing infrastructures having differing hardware components and connectivity that can be enhanced with SIP-Routing capability according to embodiments of the present invention. Likewise, the preferred method may be employed to directly route and forward actual events and for routing notification of pending events wherein subsequent call connection is a COST connection made between a terminal and a central switch of the center.

Figure 5:
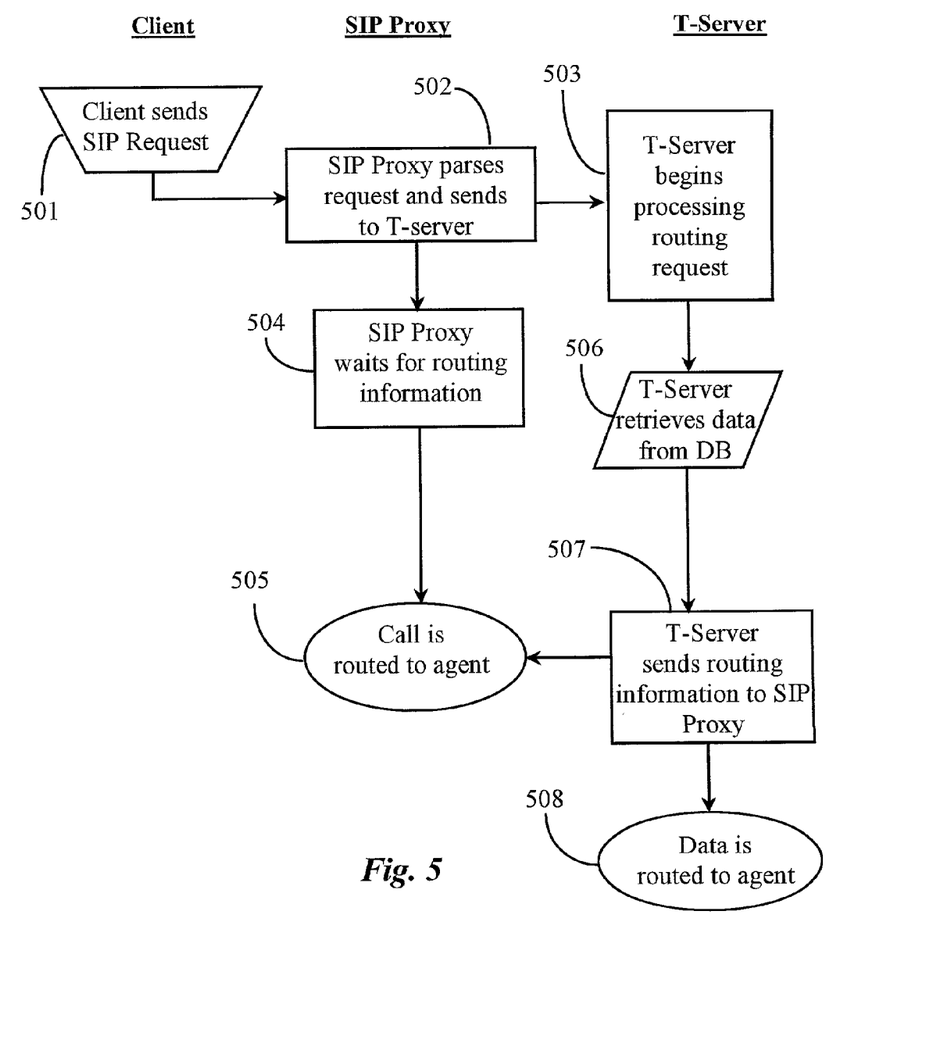
FIG. 5 a flow diagram illustrating system steps for using SIP in a communication center according to an embodiment of the present invention.

FIG. 5 shows a simplified flow diagram illustrating system steps for using SIP in a communication center according to an embodiment of the present invention. At step 501, a client of a communication center sends an SIP request to an SIP proxy analogous to server 410 of FIG. 4. This step is assumed in the case of the request originating in the Internet or other data-packet network. At step 502 the request of step 501 is received and parsed for content. This process involves separating the content data from the traditional SIP header data. Also at this step the proxy server, after parsing the data, reformats the information into a routing request expressed in the format understood by a transaction server responsible for executing intelligent routing routines according to existing routing rules. After reformatting the data, the proxy at step 502 sends the reformatted request to the T-server analogous to server 412 of FIG. 4. At step 503 the T-server receives the routing request of step 502 and begins processing the request.

In the meantime, at step 504 the proxy server waits for the result/response from the request sent at step 502. In step 504 the requesting party or originator of the event remains in queue. At step 503 the T-server uses additional information provided by form filling to help granulate a routing determination to more narrowly define an appropriate routing destination for the event. This may involve access and consultation with a server/database analogous to server 423 connected to repository 424 described with reference to FIG. 4. At this time, repository 424 may also be updated with new data from information provided with the original SIP request. At step 506 the T-server retrieves any required additional information from a database of information analogous to the repository/server combination described above. This data may be passed to an appropriate agent with or ahead of the routed event.

At step 507, the T-server responds to the request of 502, after processing and retrieving any additional data at step 506, by sending the best possible routing information or result to the proxy server. The result may well be a final routing determination or command necessitating no further determination by the proxy. In another embodiment, routing information may simply consist of a data record indicating all of the parameters of the route computation wherein some further computation to determine final destination is left for the proxy server.

At step 508, the proxy sever of step 507 routes any additional hard data to the intended recipient of the call in the form of a screen pop-up or other well-known convention. Simultaneously at step 505, the processed event is routed by the proxy server to the same recipient. The recipient is most likely a live agent but may also be an automated robotic system.

In one embodiment, the live connection is established and the session maintained within the proxy. In another embodiment only notification of an event is routed and actual physical connection made by another IP router (dumb switch) other than the proxy server. In the event of telephony events arriving through the COAST network (PSTN), the SIP request sent to the proxy is generated at an enhanced central switch wherein the IVR interaction, if any, is translated into the form content of the SIP message. Therefore, the client in 501 in the case of COST events would be the central switch analogous to switch 413 described with reference to FIG. 4. The active SIP session whether COST initiated or IPNT initiated is maintained in the proxy server or another designated server.

Using SIP data to manage internal routing enables all IP communication forms such as IP telephony, Chat, multiparty conferencing and so on to be routed and maintained as traditional telephony call events following strict intelligent routing regimens. In the case of multiparty conferencing, many steps otherwise required for conferencing in various parties is eliminated. Each selected party would receive an identical routed event, which when taken or picked-up automatically initiates the party into the conference. Similarly, other traditional steps associated with center telephony such as call holding, call waiting, call transfer, etc. can be simplified using SIP parameters. Many individual characteristics of SIP capability can be leveraged for media identification, reserving bandwidth, end user identification, protocol switching to improve transmission quality, and so on.

The method and apparatus of the present invention can be practiced internally within a communication center and externally between communications centers connected to a common network. The invention may also be practiced on virtual IPNT communication networks utilizing remote agents. All that is required in the case of a virtual center is a centralized routing point (proxy server) and the transaction server capabilities and routines required to provide intelligent routing among remotely connected agents.

The method and apparatus of the present invention should, in light of the many applicable embodiments, be afforded the broadest scope under examination. The method and apparatus of the present invention should be limited only by the claims that follow.

What is claimed is:

1. A system for routing a communication event in a call center having routing provided by a computer-telephony intergration (CTI) server, the event initiated by an originator at a computerized workstation outside the call center, comprising:
   a software-enabled session initiation protocol (SIP) mechanism operable on the workstation by the originator to prepare and send an SIP-protocol routing request along with an event initiation; and
   a software enabled reformatting mechanism in the call center receiving and processing the SIP-protocol routing request;
   characterized in that the reformatting mechanism converts the SIP routing request into non-SIP protocol understood by the CTI server, and sends the resulting non-SIP request to the CTI-server for processing and response, and the CTI server determines and returns a routing for the communication event.

2. The system of claim 1 wherein the communication event arrives at the call center from a data packet network.

3. The system of claim 2 wherein the data-packet-network comprises the Internet network.

4. The system of claim 3 wherein the Internet network further connects to a loca area network (LAN) network.

5. The system of claim 1 wherein the CTI server controls routing within the call center.

6. The system of claim 1 wherein the communication events are received from clients of the call center and routed to agents or automated systems at work within the center.

7. A method for routing a communication event in a call center having routing provided by a computer-telephony intergration (CTI) server, the event initiated by an originator at a computerized workstation outside the call center, comprising the steps of:
   a) preparing and sending a session initiation protocol (SIP) routing request along with the initiated event by a software-enabled SIP mechanism operable on the workstation by the originator;
   b) receiving end processing the SIP-protocol routing request by a software enabled reformatting mechanism in the call center;
   c) converting the SIP routing request into non-SW protocol understood by the CTI server by the reformatting mechanism;
   d) sending the non-SIP request to the CTI-server for processing and response; and
   e) determining a routing for the communication event by the CTI-server.

8. The method of claim 7 wherein the communication event arrives at the call center from a data packet network.

9. The method of claim 8 wherein the data packet network comprises the Internet network.

10. The method of claim 9, wherein the Internet network further connects to a local area network (LAN) network.

11. The method of claim 7 wherein the (CTI) server controls routing within the call center.

12. The method of claim 7 wherein the communication events are received from clients of the call center and routed to agents or automated systems at work within the center.

* * * * *